(12) United States Patent
Chou

(10) Patent No.: US 9,868,420 B2
(45) Date of Patent: Jan. 16, 2018

(54) AIR COMPRESSOR

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 39 days.

(21) Appl. No.: 15/099,592

(22) Filed: Apr. 15, 2016

(65) Prior Publication Data

US 2016/0311411 A1    Oct. 27, 2016

(30) Foreign Application Priority Data

Apr. 23, 2015 (TW) .............................. 104113113 A

(51) Int. Cl.
*B60S 5/04* (2006.01)
*F04B 35/04* (2006.01)
*F04B 35/06* (2006.01)
*B29C 73/16* (2006.01)
*B29L 30/00* (2006.01)

(52) U.S. Cl.
CPC ............ *B60S 5/046* (2013.01); *B29C 73/166* (2013.01); *F04B 35/04* (2013.01); *F04B 35/06* (2013.01); *B29L 2030/00* (2013.01); *B60S 5/04* (2013.01)

(58) Field of Classification Search
CPC .......... B60S 5/04; B60S 5/046; B29C 73/166; F04B 35/04; F04B 35/06; B29L 2030/00
USPC ........................................... 141/38; 152/415
See application file for complete search history.

(56) References Cited

U.S. PATENT DOCUMENTS

| | | | | |
|---|---|---|---|---|
| 6,283,172 B1 * | 9/2001 | Thurner | ................ | B29C 73/166 141/114 |
| 6,736,170 B2 * | 5/2004 | Eriksen | ................ | B29C 73/166 141/102 |
| 6,789,581 B2 * | 9/2004 | Cowan | .................. | B29C 73/166 141/100 |
| 6,964,284 B2 * | 11/2005 | Eckhardt | ............... | B29C 73/166 141/100 |
| 7,694,698 B2 * | 4/2010 | Marini | .................. | B29C 73/166 141/38 |
| 7,798,183 B2 * | 9/2010 | Cegelski | ............... | B29C 73/166 141/38 |
| 8,181,676 B2 * | 5/2012 | Steele | ................... | B29C 73/166 141/114 |
| 8,336,581 B2 * | 12/2012 | Lolli | ..................... | B29C 73/166 141/38 |
| 8,439,089 B2 * | 5/2013 | Guan | .................... | B29C 73/166 141/104 |
| 8,627,857 B2 * | 1/2014 | Chou | ................... | B29C 73/166 141/38 |
| 8,631,840 B2 * | 1/2014 | Lolli | ..................... | B29C 73/166 141/104 |
| 8,684,046 B2 * | 4/2014 | Kojima | ................. | B29C 73/166 141/38 |
| 8,746,292 B2 * | 6/2014 | Lolli | ..................... | B29C 73/166 141/197 |
| 8,746,293 B2 * | 6/2014 | Chou | ....................... | B60S 5/04 141/38 |

(Continued)

*Primary Examiner* — Nicholas A Arnett

(57) ABSTRACT

An air compressor includes a box and a compressor unit installed in the box. The box is provided with a connection socket. The compressor unit has an air outlet exposed to the connection socket of the box. An external device, such as a hose or a sealant bottle, can be firmly and detachably assembled onto the connection socket of the box, and can be connected between the outlet of the compressor unit and the air nozzle of a tire, so that the tire can be inflated or repaired safely and effectively.

5 Claims, 9 Drawing Sheets

(56) References Cited

U.S. PATENT DOCUMENTS

| | | | | |
|---|---|---|---|---|
| 8,752,595 B2* | 6/2014 | Marini | B29C 73/166 |
| | | | | 141/38 |
| 8,978,716 B2* | 3/2015 | Chou | B60S 5/043 |
| | | | | 137/231 |
| 9,027,608 B2* | 5/2015 | Chou | B29C 73/166 |
| | | | | 141/38 |
| 9,545,763 B2* | 1/2017 | Chou | B29C 73/025 |
| 2003/0056851 A1* | 3/2003 | Eriksen | B29C 73/166 |
| | | | | 141/38 |
| 2008/0145245 A1* | 6/2008 | Chou | B29C 73/166 |
| | | | | 417/415 |
| 2009/0050232 A1* | 2/2009 | Guan | B29C 73/166 |
| | | | | 141/38 |
| 2009/0266440 A1* | 10/2009 | Lolli | B29C 73/166 |
| | | | | 141/38 |
| 2012/0017727 A1* | 1/2012 | Lolli | B29C 73/166 |
| | | | | 81/15.5 |
| 2013/0105055 A1* | 5/2013 | Chou | B60S 5/043 |
| | | | | 152/416 |
| 2013/0284312 A1* | 10/2013 | Chou | B29C 73/166 |
| | | | | 141/38 |
| 2015/0377230 A1* | 12/2015 | Chou | F04B 53/16 |
| | | | | 417/415 |
| 2016/0076963 A1* | 3/2016 | Chou | F04B 35/01 |
| | | | | 73/756 |
| 2016/0136906 A1* | 5/2016 | Chou | B29C 73/025 |
| | | | | 141/38 |

* cited by examiner

AIR COMPRESSOR

(a) TECHNICAL FIELD OF THE INVENTION

The present invention relates to an air compressor, which includes a box and a compressor unit installed in the box, wherein the box is provided with a connection socket, and the compressor unit has an outlet exposed to the connection socket, whereby an external device, such as a hose or a sealant bottle, can be firmly and detachably onto the connection socket of the box, and can be connected between the outlet of the compressor unit and the air nozzle of a tire, so that the tire can be inflated or repaired safely and effectively.

(b) DESCRIPTION OF THE PRIOR ART

Conventional air compressors for inflating and repairing tires generally include a box accommodating therein a compressor unit, a sealant bottle containing therein a chemical sealant for repairing punctures of tires and provided with a cap for sealing its mouth, and two hoses, wherein the cap is provided with an inlet connector and an outlet connector, one hose can be connected between the outlet of the compressor unit and the inlet connector of the sealant bottle, and the other hose can be connected between the outlet connector of the sealant bottle and the air nozzle of a punctured tire. However, among those air compressors, the compressor units thereof only allow a specific type of hose or sealant bottle to be applied for inflating or repairing a tire.

For solving the disadvantage of conventional air compressors, the applicant has contrived an improved air compressor, wherein the outlet of the compressor unit is exposed to a connection socket of the box, whereby an external device, such as a hose or a sealant bottle, can be firmly and detachably assembled onto the connection socket of the box and connected between the outlet of the compressor unit and the air nozzle of a tire for inflating or repairing the tire.

SUMMARY OF THE INVENTION

One object of the present invention is to provide an air compressor, which comprises a box and a compressor unit installed in the box, wherein the box is provided with a connection socket, and the compressor unit has an outlet exposed to the connection socket of the box, whereby an external device can be firmly and detachably assembled onto the connection socket of the box and connected between the compressor unit and a tire, so that the tire can be inflated or repaired the tire effectively and safely.

According to one feature of the present invention, the external device assembled onto the connection socket of the box is a hose, one end of which is connected with the outlet of the compressor unit, and the other end of which is connected with a tire, so as to inflate the tire.

According to another feature of the present invention, the external device assembled onto the connection socket of the box is a sealant bottle having an inlet connector and an outlet connector, wherein the inlet connector of the sealant bottle is directly connected with the outlet of the compressor unit, and the outlet connector of the sealant bottle is connected to the air nozzle of a punctured tire by using a hose therebetween, whereby compressed air from the outlet of the compressor unit can be delivered into the sealant bottle to force the chemical sealant contained in the sealant bottle to flow into the punctured tire, thus inflating and repairing the punctured tire.

According to a further feature of the present invention, the external device assembled onto the connection socket of the box is a sealant bottle having an inlet connector and an outlet connector, wherein the inlet connector of the sealant bottle is connected to the outlet of the compressor unit by using a first hose therebetween, and the outlet connector of the sealant bottle is connected to the air nozzle of a punctured tire by using a second hose therebetween, whereby compressed air from the outlet of the compressor unit can be delivered into the sealant bottle to force the chemical sealant contained in the sealant bottle to flow into the punctured tire, thus inflating and repairing the punctured tire.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
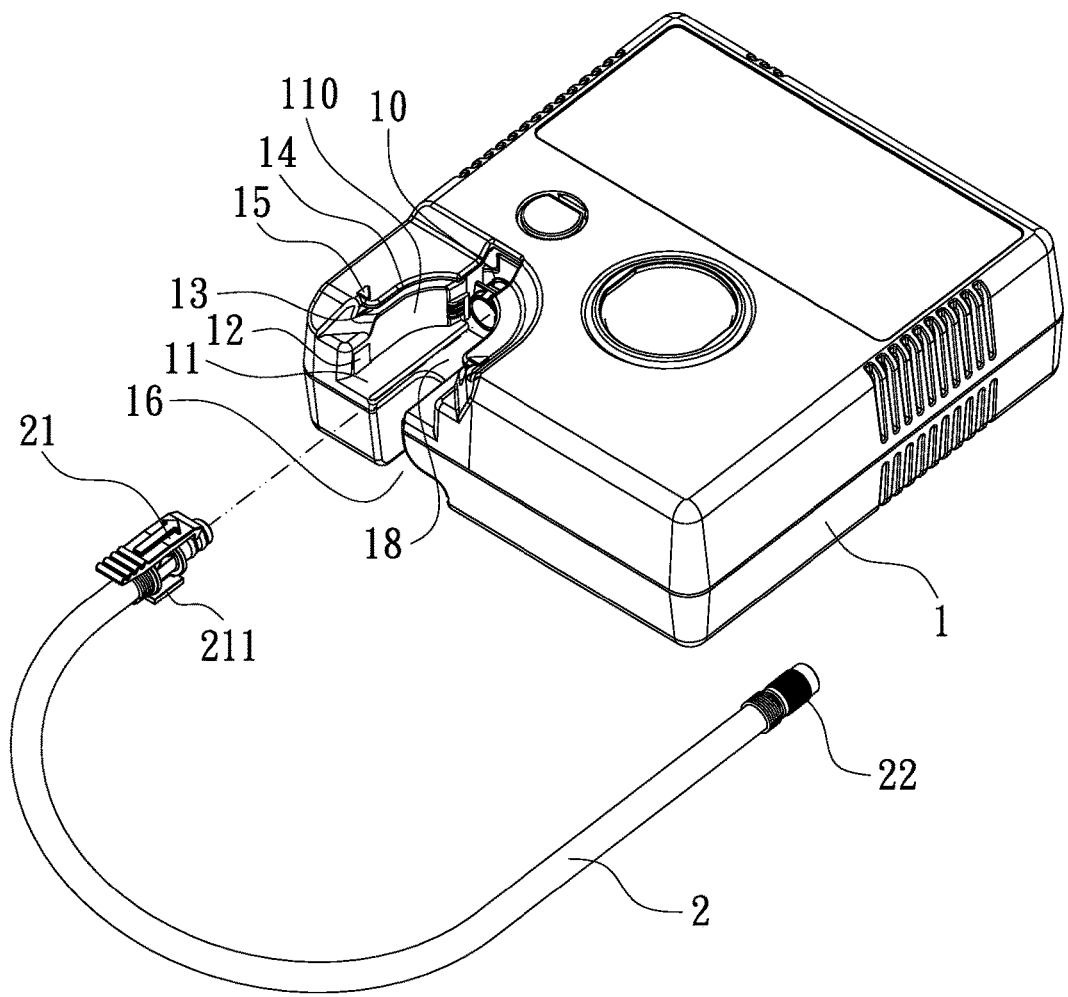
FIG. 1 shows an exploded view of an air compressor according to a first embodiment of the present invention, wherein a hose and a box accommodating therein a compressor unit are included.
Figure 2:
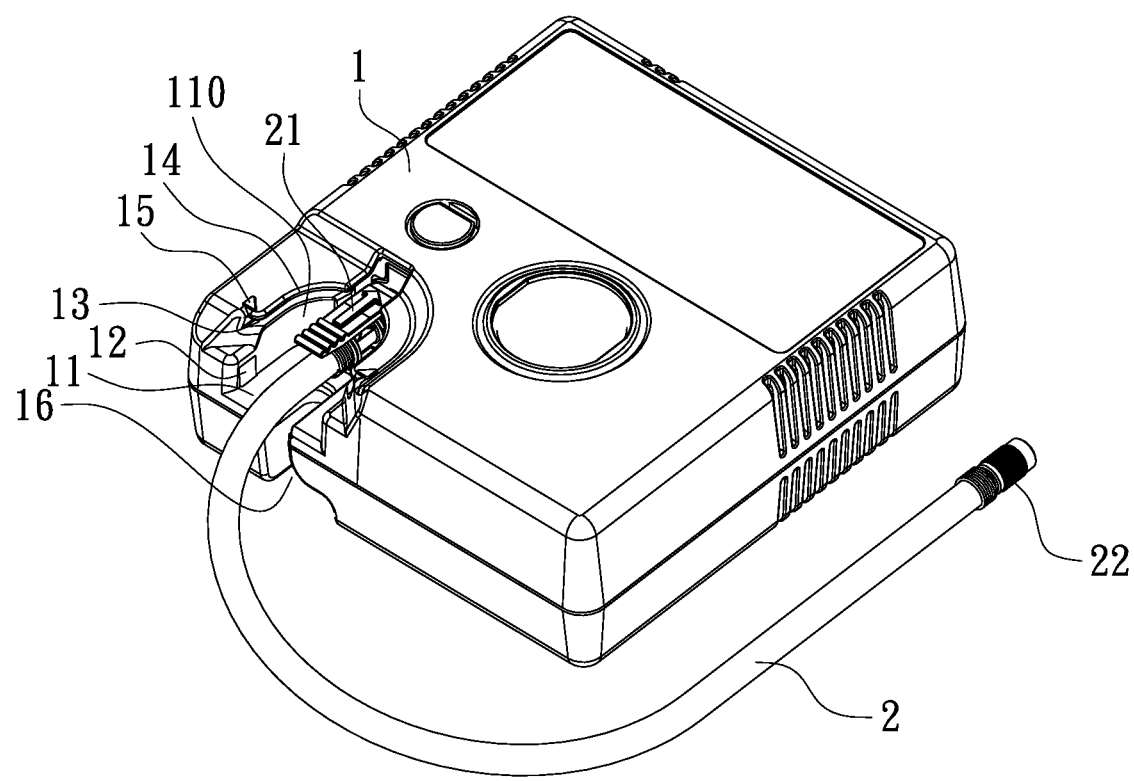
FIG. 2 shows a working view of the first embodiment of the air compressor, wherein the hose is connected to the outlet of the compressor unit inside the box.

Referring to FIGS. 1 and 2, an air compressor according to a first embodiment of the present invention is shown, which generally comprises a box 1 and a compressor unit installed in the box 1. The box 1 is provided with a connection socket 11 defining a recessed space which vertically and horizontally opens onto ambient environment of the box 1. The compressor unit has an outlet 10 exposed to the connection socket 11 for being connected with an external device which can be in turn connected to the air nozzle of a tire for inflating or repairing the tire. The compressor unit can be electrically connected to a DC power supply, such as a cigarette lighter receptacle, in a vehicle or an individual DC power supply for starting the compressor unit.

Figure 3:
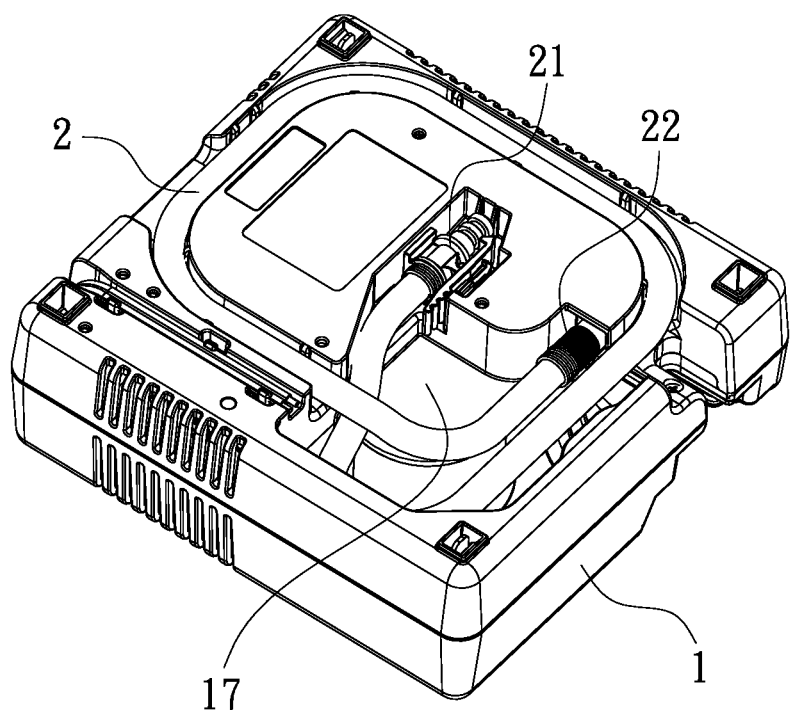
FIG. 3 shows another working view of the first embodiment of the air compressor, wherein the hose is stored at the back of the box.

Referring again to FIG. 1, the recessed space of the connection socket 11 is substantially U-shaped in horizontal cross section. As shown, the recessed space of the connection socket 11 is defined by two opposite sides 110 and a bottom surface between the two opposite sides 110, wherein each side of the recessed space of the connection socket 11 is provided with a guiding means which defines a curved groove 13 extending generally towards the outlet 10 of the compressor unit. The two guiding means at the two opposite sides 110 of the recessed space of the connection socket 11 are opposite to each other. Specifically, the curved groove 13 of each guiding means is defined by a delimiting strip 14 which forms as a top of the corresponding side of the recessed space of the connection socket 11, wherein each delimiting strip 14 is provided with an engagement block 15 thereon. Furthermore, each side of the recessed space of the connection socket 11 defines an engagement recess 12 below the curved groove 13, so that the aforementioned external device can be firmly and detachably assembled onto the connection socket 11 more firmly. The bottom surface between the two opposite sides 110 of the connection socket 11 has a recessed surface 18. In addition, the box 1 defines a receiving space 17 at its back (see FIG. 3), and a passage 16 which communicates with the recessed space of the connection socket 11 and the receiving space 17.

In the first embodiment, the external device is implemented as a hose 2 which has a first end 21 for being connected with the outlet 10 of the compressor unit. Particularly, the hose 2 is provided at its first end 21 with a bottom plate 211 which can be fitted onto the recessed surface 18 formed on the bottom surface of the connection socket 11. Thus, in connecting the hose 2 to the outlet 10 of compressor unit, the bottom plate 21 can guide the first end 21 of the hose 2 to move towards the outlet 10 of the compressor unit, so that the hose 2 can be connected to the outlet 10 of the compressor unit more easily. The hose 2 has a second end 22 which can be connected to the air nozzle of a tire for inflating the tire (not shown). After the inflation is completed, the hose 2 can be detached from the outlet 10 of the compressor unit, and then can be stored in the receiving space 17 at the back of the box 1 (see FIG. 3).

Figure 4:
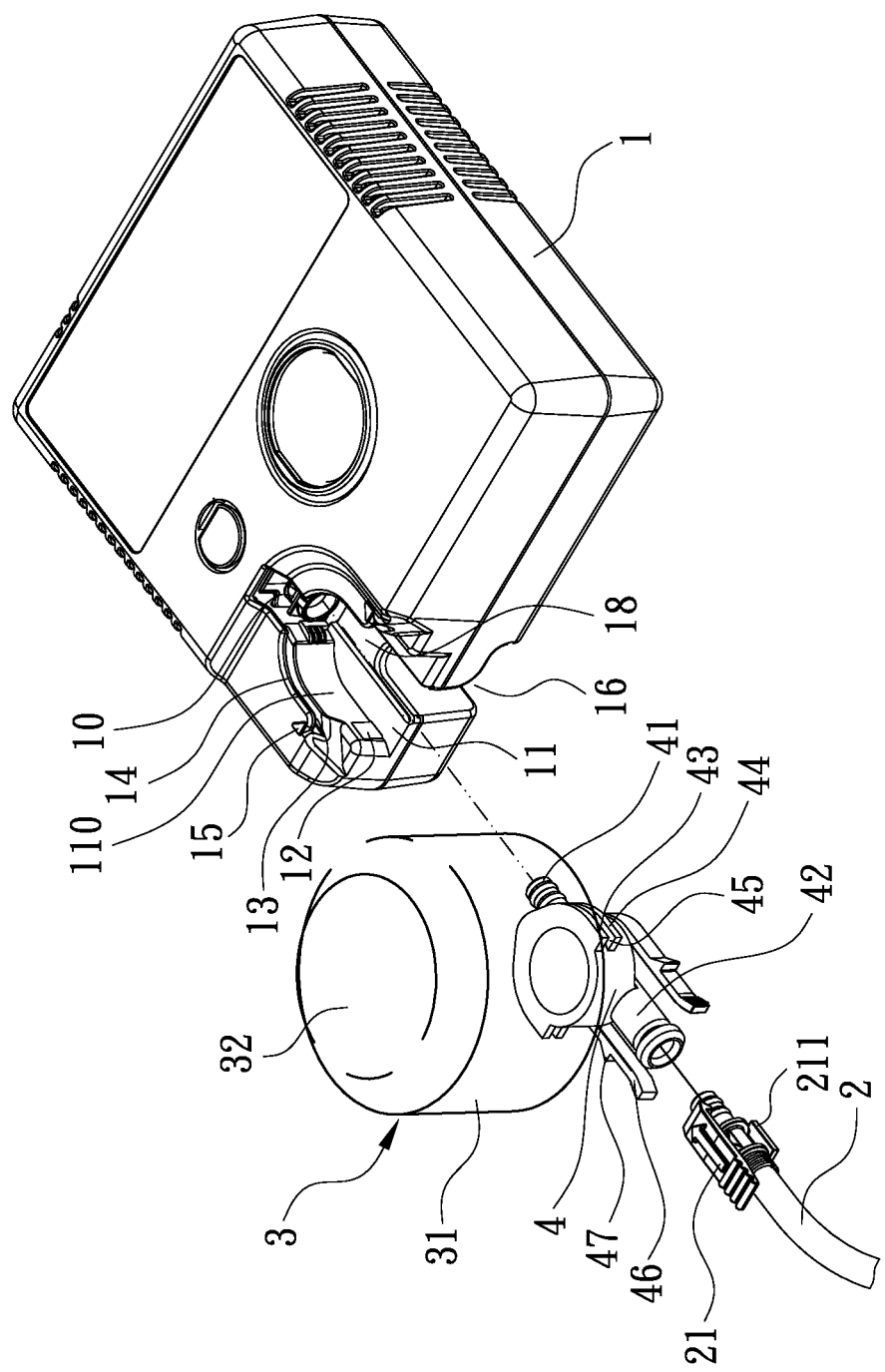
FIG. 4 shows an exploded view of an air compressor according to a second embodiment of the present invention, wherein a sealant bottle, a hose, and a box accommodating therein a compressor unit are included.
Figure 5:
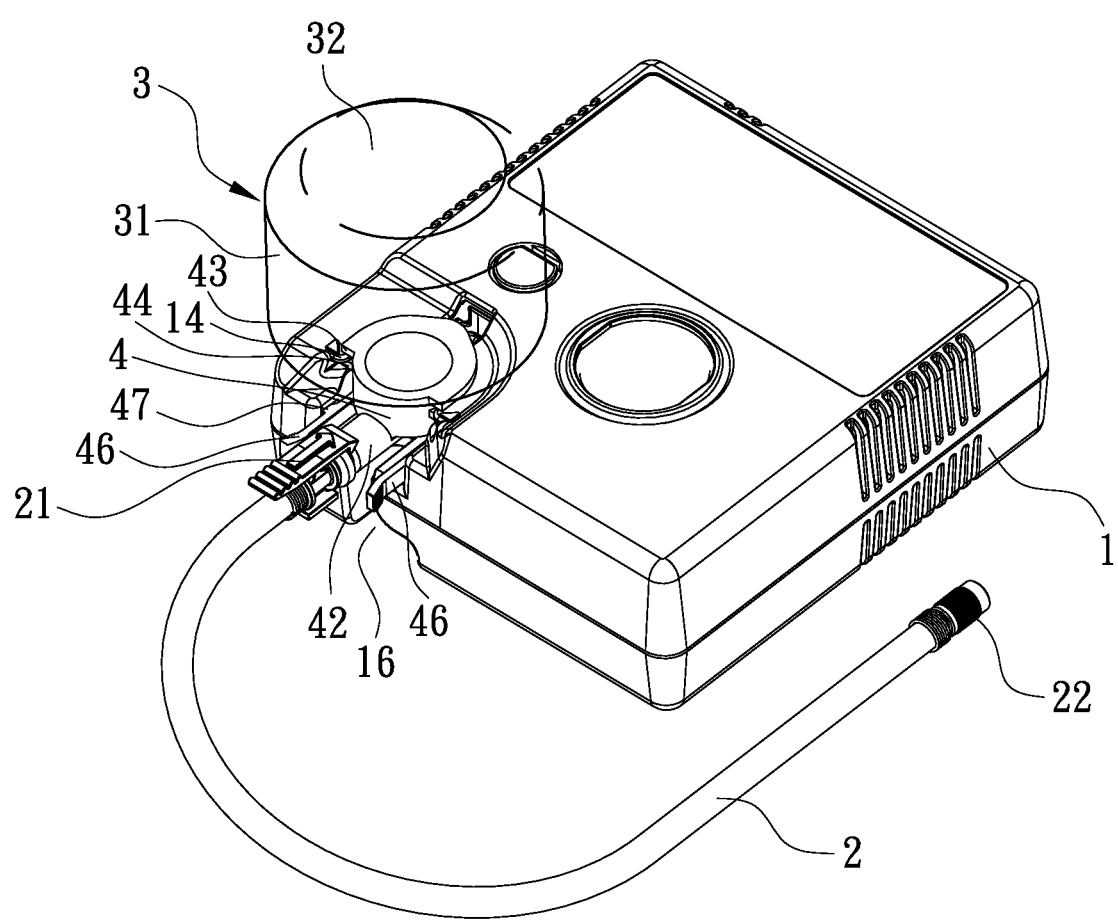
FIG. 5 shows a working view of the second embodiment of the air compressor, wherein the sealant bottle is directly connected to the outlet of the compressor unit inside the box.
Figure 6:
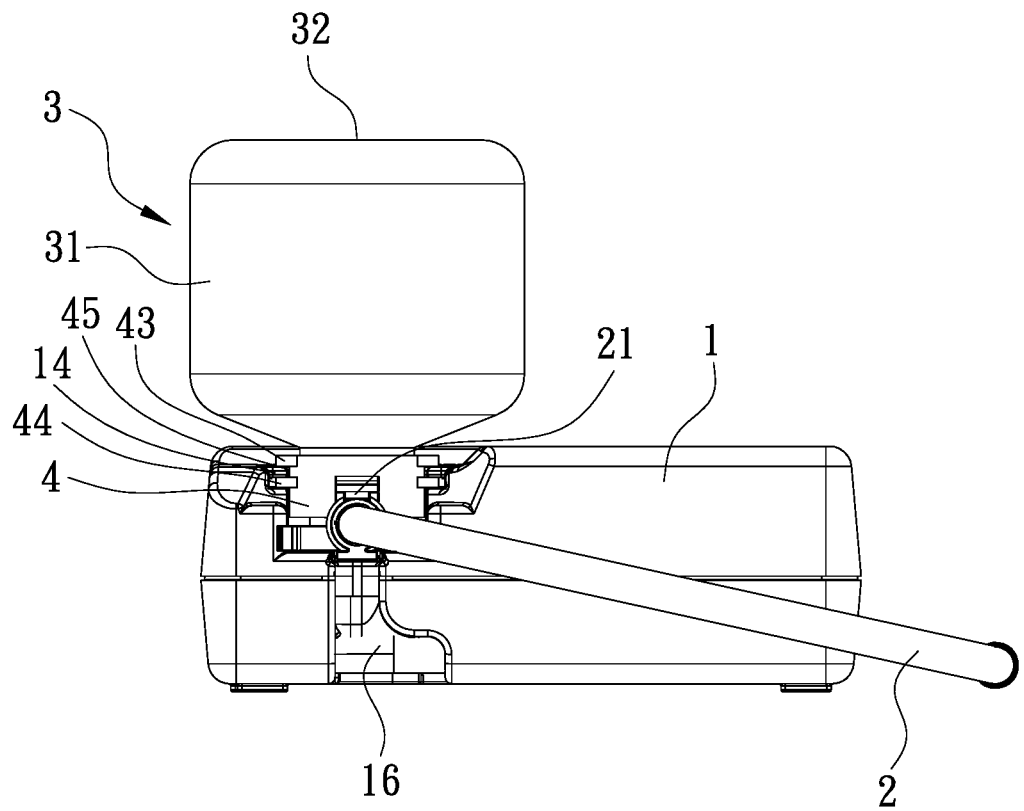
FIG. 6 shows a front view of the second embodiment of the air compressor, wherein the sealant bottle is directly connected to the outlet of the compressor unit inside the box.

Referring to FIG. 4, there is shown a second embodiment of the present invention, wherein the external device is implemented as a sealant bottle 3, which includes a container body 31 containing therein a chemical sealant for repairing punctures of tires, and a cap 4 for sealing an opening of the container body 31. The cap 4 has an inlet connector 41 and an outlet connector 42, both of which communicate with an inner space of the container body 31. The cap 4 is provided with two opposite guiding means and two opposite resilient strips 46. Each guiding means is composed of two parallel, spaced projections, including a first projection 43 and a second projection 44 corresponding to the curved grooves 13 of the connection socket 11, wherein a channel 45 is defined between the two projections 43, 44 of each guiding means, and each resilient strip 46 is provided with an engagement protrusion 47 corresponding to the engagement recesses 12 of the connection socket 11. In use, the sealant bottle 3 can be inverted so that its bottom 32 is above the associated cap 4 for being assembled onto the connection socket 11 of the box 1 (see also FIGS. 5 and 6), wherein the inlet connector 41 of the cap 4 is directly connected to the outlet 10 of the compressor unit, the delimiting strips 14 of the connection socket 11 are inserted into the channels 45 between the two projections 43, 44 of the cap 4, the second projections 44 of the cap 4 are inserted into the curved grooves 13 of the connection socket 11, and the engagement protrusions 47 of the resilient strips 46 are engaged with the engagement recesses 12 of the connection socket 11. Since the delimiting strips 14 of the two opposite guiding means of the connection socket 11 are inserted into the channels 45 between the two projections 43, 44, and the engagement protrusions 47 of the resilient strips 46 are engaged with the engagement recesses 12 of the connection socket 11, the sealant bottle 3 can be firmly assembled onto the connection socket 11 of the box 1, and thus can be prevented from falling off due to vibration or impact. Furthermore, the outlet connector 42 of the cap 4 can be connected to a punctured tire by using a hose 2 therebetween, wherein the first end 21 of the hose 2 can be connected with the outlet connector 42 of the cap 4, and the second end 22 of the hose 2 can be connected with the air nozzle of a punctured tire (not shown). When the air compressor is started, compressed air can be delivered into the sealant bottle 3 via the outlet 10 of the compressor unit, and thus the chemical sealant contained in the sealant bottle 3 can be forced to flow into the punctured tire via the hose 2, so that the punctured tire can be inflated and repaired. After the inflation and repair is completed, the user may depress the resilient strip 46 of the cap 4 and thus can remove the sealant bottle 3 together with the cap 4 out of the connection socket 11 of the box 1, so that the sealant bottle 3 can be disconnected from the outlet 10 of the compressor unit (see FIG. 4).

Figure 7:
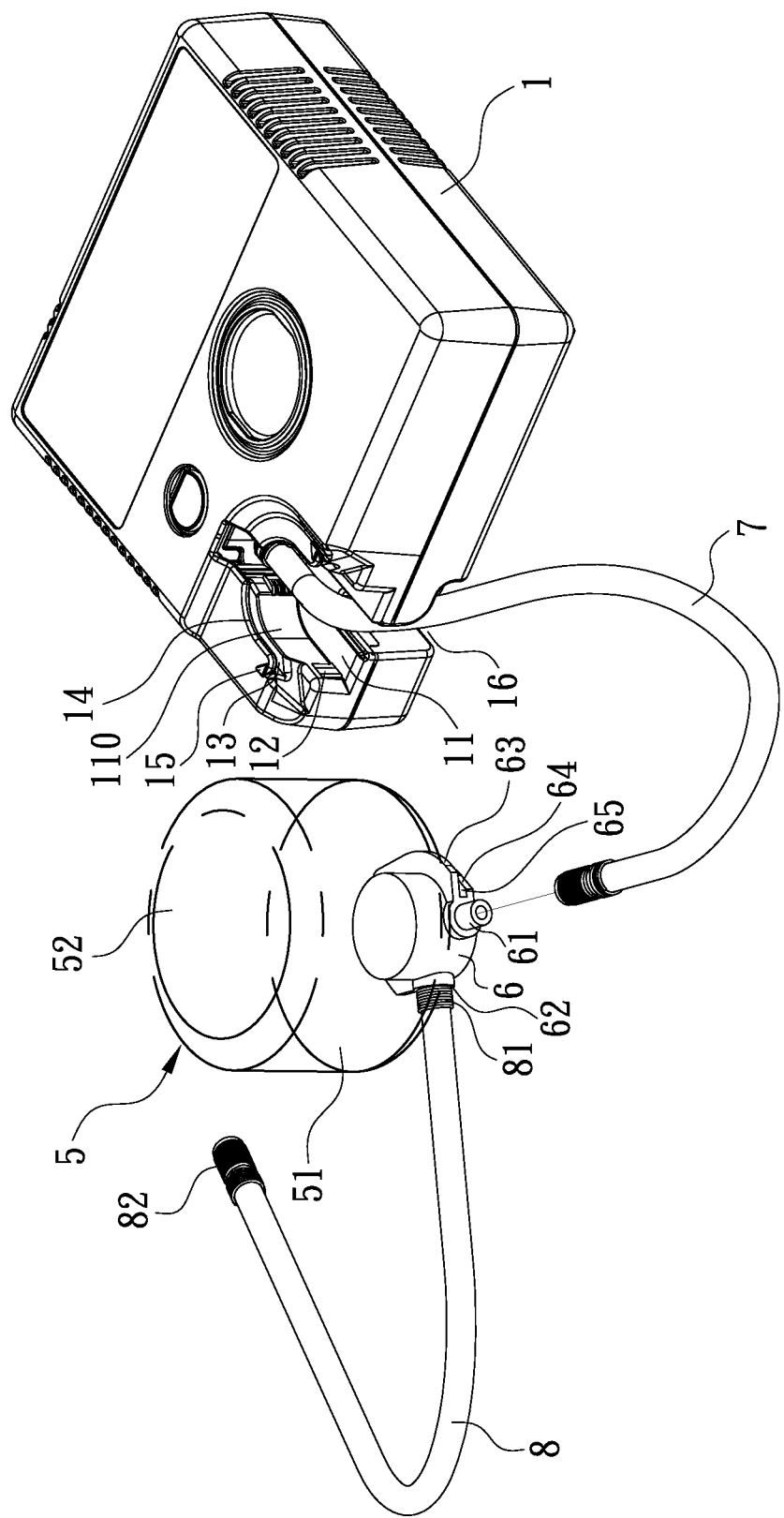
FIG. 7 shows an exploded view of an air compressor according to a third embodiment of the present invention, wherein a sealant bottle, two hoses, and a box accommodating therein a compressor unit are included.
Figure 8:
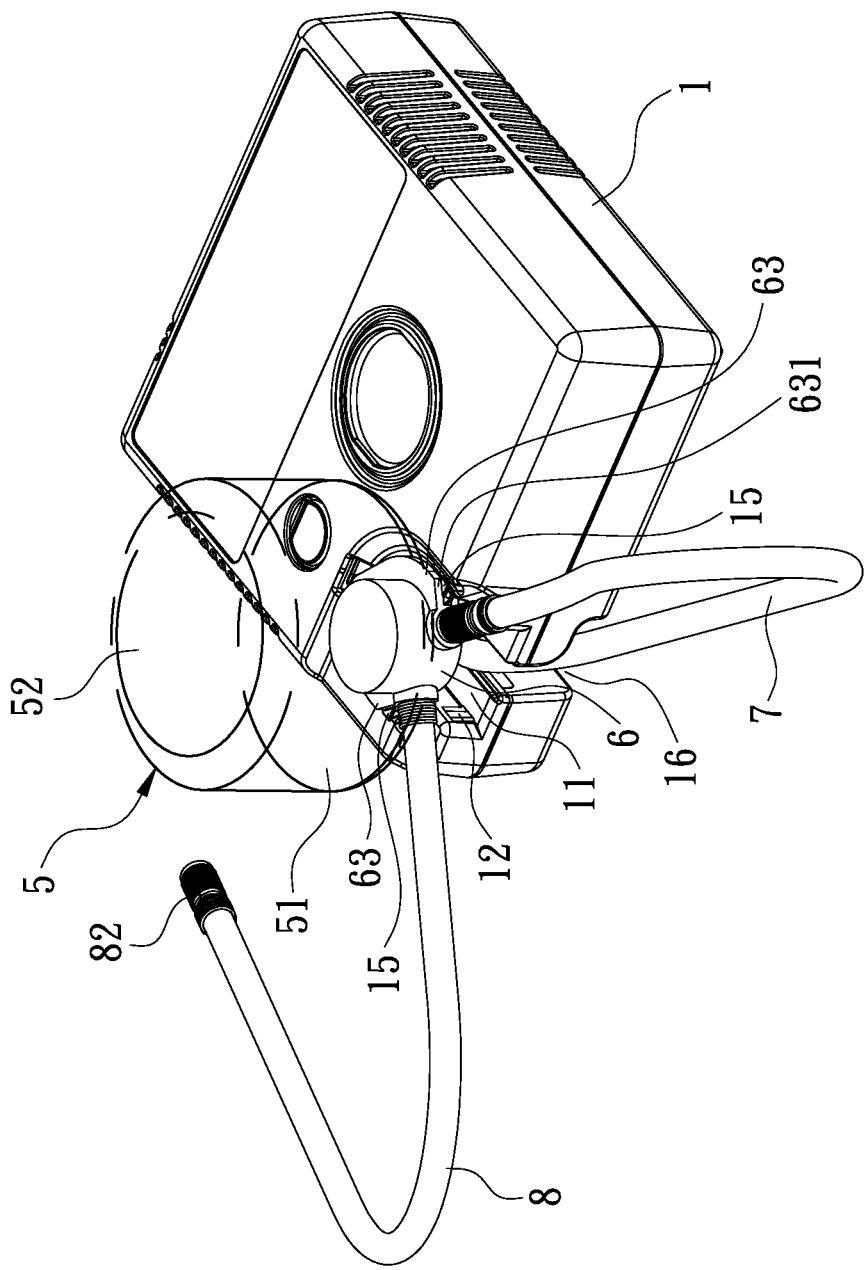
FIG. 8 shows a working view of the third embodiment of the air compressor, wherein the sealant bottle is connected to the outlet of the compressor unit inside the box by using a hose.
Figure 9:
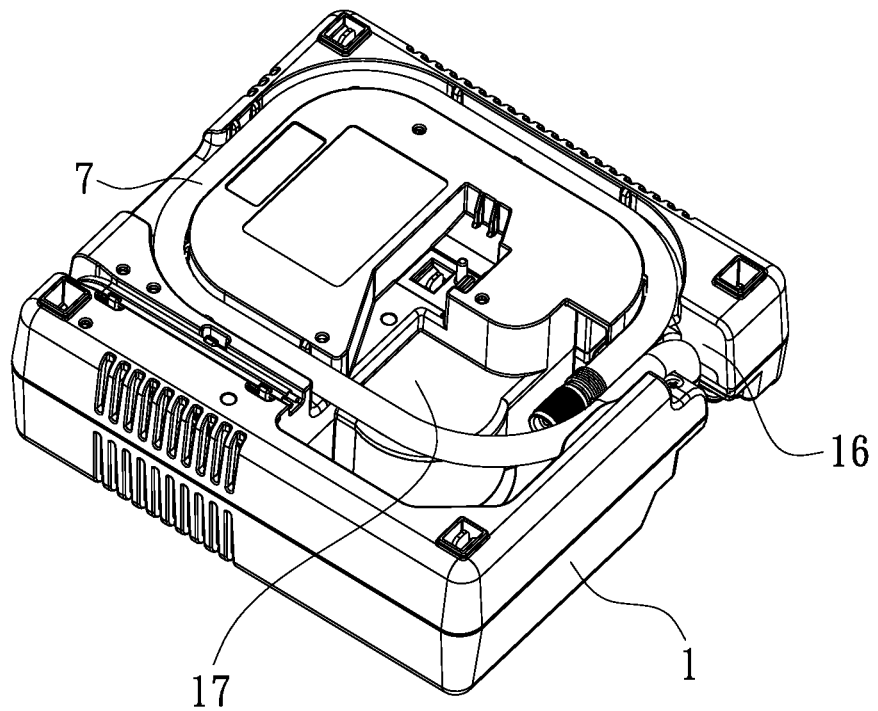
FIG. 9 shows another working view of the third embodiment of the air compressor, wherein the hose for connecting between the sealant bottle and the outlet of the compressor unit is stored at the back of the box.

Referring to FIG. 7, there is shown a third embodiment of the present invention, wherein the external device is implemented as a sealant bottle 6, which includes a container body 51 containing therein a chemical sealant for repairing punctures of tires, and a cap 6 for sealing an opening of the container body 51. The cap 6 has an inlet connector 61 and an outlet connector 62, both of which communicate with an inner space of the container body 51. Furthermore, the cap 6 is provided with two opposite guiding means as the cap 3 of the second embodiment. Each guiding means is composed of two parallel, spaced projections, including a first projection 63 and a second projection 64 corresponding to the curved grooves 13, wherein a channel 65 is defined between the two projections 63, 64 of each guiding means. In use, the sealant bottle 5 can be inverted so that its bottom 52 is above the associated cap 6. The inverted sealant bottle 5 can be placed on the ground to work with the compressor unit inside the box 1. Preferably, the inverted sealant bottle 5 can be assembled onto the connection socket 11 of the box 1 (see FIG. 8), wherein the inlet connector 61 is connected to the inlet 10 of the compressor unit by using a first hose 7 therebetween (i.e., one end of the hose 7 is connected with the outlet 10 of the compressor unit while the other end of the hose 7 is connected with the inlet connector 61 of the cap 6), the delimiting strips 14 of the two guiding means of the connection socket 11 are inserted into the channels 65 between the two projections 63, 64 of the cap 6, the second projections 64 of the cap 6 are inserted into the grooves 13 of the connection socket 11, and rear edges 631 of the first projection 63 of the cap 6 are engaged with the engagement blocks 15 provided on the delimiting strips 14 of the connection socket 11. Since the delimiting strips 14 of the two guiding means of the connection socket 11 are inserted into the channels 65 between the two projections 63, 64 of the cap 6, and the rear edges 631 of the first projections 63 are engaged with the engagement blocks 15 provided on the delimiting strips 14 of the two guiding means of the connection socket 11, the sealant bottle 5 can be firmly assembled onto the connection socket 11 of the box 1, and thus can be prevented from falling off due to vibration or impact. Furthermore, the outlet connector 62 of the cap 6 can be connected to a punctured tire by using a second hose 8 therebetween, wherein the first end 81 of the second hose 8 is connected with the outlet connector 62 of the cap 6, whereas the second end 82 of the second hose 8 is connected with the air nozzle of the punctured tire (not shown). When the air compressor is started, compressed air can be delivered into the sealant bottle 5 via the outlet 10 of the compressor unit and the first hose 7, and thus the chemical sealant contained in the sealant bottle 5 can be forced to flow into the tire via the second hose 8, so that the punctured tire can be inflated and repaired. After the inflation and repair is completed, the user can slightly lift the cap 6 to disengage the rear edges 631 of the first projections 63 from the engagement blocks 15 provided on the delimiting strips 14 of the connection socket 11, so that the sealant bottle 5 can be disassembled from the connection socket 11 of the box 1. Next, the user can detach the first hose 7 from the inlet connector 61 of the cap 6 (see FIG. 7). Finally, the first hose 7 can be routed through the passage 16 to be stored in the receiving space 17 at the back of the box 1 (see FIG. 9).

As a summary, the air compressor of the present invention includes a box 1 and a compressor unit installed in the box 1, wherein the box 1 is provided with a connection socket 11, and the compressor unit has an outlet 10 exposed to the connection socket 11. As such, an external device, such as a hose or a sealant bottle, can be firmly assembled onto the connection socket 11 of the box 1, and then the external device can be connected to a tire, so that the tire can be inflated or repaired safely and effectively.

I claim:

1. An air compressor, which comprises a box and a compressor unit installed in the box, wherein the box is provided with a connection socket defining a recessed space which vertically and horizontally opens onto ambient environment of the box, and the compressor unit has an air outlet exposed to the connection socket of the box for being connected with an external device which is in turn connected to an air nozzle of a tire for inflating or repairing the tire, wherein the recessed space of the connection socket is substantially U-shaped in horizontal cross section, and is defined by two opposite sides and a bottom surface between the two opposite sides; wherein each side of the recessed space of the connection socket defines a groove extending generally towards the outlet of the compressor unit, and defines an engagement recess below the groove for detachably mounting with the external device, and the groove of each side of the recessed space of the connection socket is defined by a delimiting strip which forms as a top of the corresponding side of the recessed space of the connection socket, each delimiting strip being provided with an engagement block thereon; the box defines a receiving space at its back and a passage under the recessed space of the connection socket, the passage communicating with the recessed space of the connection socket and the receiving space.

2. The air compressor of claim 1, wherein the external device is a hose which has a first end for being detachably connected with the outlet of the compressor unit, and a second end for being connected with an air nozzle of a tire for inflating the tire.

3. The air compressor of claim 2, wherein a bottom surface of the recessed space of the connection socket has a recessed surface; the first end of the hose is provided with a bottom plate which is capable of being fitted onto the recessed surface and being guided by the recessed surface to move towards the outlet of the compressor unit, so that the first end of the hose can be detachably connected with the outlet of the compressor unit.

4. The air compressor of claim 1, wherein the external device is a sealant bottle which includes a container body and a cap for sealing an opening of the container body, the cap having an inlet connector and an outlet connector, both of which communicate with an inner space of the container body, the cap being provided with two opposite guiding means and two opposite resilient strips, each guiding means being composed of two parallel, spaced projections including a first projection and a second projection, wherein a channel is defined between the two projections of each guiding means, and each resilient strip is provided with an engagement protrusion; whereby the sealant bottle is inverted to be firmly assembled onto the connection socket of the box, wherein the inlet connector of the cap is directly connected with the outlet of the compressor unit, the delimiting strips of the connection socket are inserted into the channels between the projections of the cap, the second projections of the cap are inserted into the grooves of the connection socket, and the engagement protrusions of the resilient strips are engaged with the engagement recesses at the two opposite sides of the connection socket of the box.

5. The air compressor of claim 1, wherein the external device is a sealant bottle which includes a container body and a cap for sealing an opening of the container body, the cap having an inlet connector and an outlet connector, both of which communicate with an inner space of the container body, the cap being provided with two opposite guiding means, each of which is composed of two parallel, spaced projections including a first projection and a second projection, wherein a channel is defined between the two projections of each guiding means; whereby the sealant bottle is inverted to be firmly assembled onto the connection socket of the box, wherein the inlet connector of the cap is connected to the inlet of the compressor unit by using a hose therebetween, the delimiting strips of the connection socket are inserted into the channels between the projections of the cap, the second projections of the cap are inserted into the grooves of the connection socket, and rear edges of the first projection of the cap are engaged with the engagement blocks provided on the delimiting strips of the connection socket of the box.

* * * * *